(12) United States Patent
Wang et al.

(10) Patent No.: US 8,188,185 B2
(45) Date of Patent: May 29, 2012

(54) BIODEGRADABLE PACKAGING FILM

(75) Inventors: James H. Wang, Appleton, WI (US); Sara A. Funk, Omro, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 849 days.

(21) Appl. No.: 12/164,487

(22) Filed: Jun. 30, 2008

(65) Prior Publication Data
US 2009/0324917 A1    Dec. 31, 2009

(51) Int. Cl.
*C08B 31/00*    (2006.01)

(52) U.S. Cl. ............... 525/54.24; 525/410; 525/411; 525/413; 525/415; 525/417; 525/418; 525/419; 525/420; 525/425; 525/430; 525/433; 525/434; 525/436; 525/437; 525/439; 525/444; 525/448; 525/450; 525/451; 524/537; 524/538; 524/539; 524/548; 524/556

(58) Field of Classification Search .............. 524/537, 524/538, 539, 548, 556; 525/410, 411, 413, 525/415, 417, 418, 419, 420, 425, 430, 433, 525/434, 436, 437, 439, 444, 448, 450, 451, 525/54.24
See application file for complete search history.

(56) References Cited

U.S. PATENT DOCUMENTS

| | | |
|---|---|---|
| 3,137,592 A | 6/1964 | Protzman et al. |
| 3,655,129 A | 4/1972 | Seiner |
| 3,963,656 A | 6/1976 | Meisert et al. |
| 4,174,330 A | 11/1979 | Gilbert et al. |
| 4,209,417 A | 6/1980 | Whyte |
| 4,797,468 A | 1/1989 | De Vries |
| 5,028,648 A | 7/1991 | Famili et al. |
| 5,028,658 A | 7/1991 | David et al. |
| 5,093,422 A | 3/1992 | Himes |
| 5,102,465 A | 4/1992 | Lamond |
| 5,169,706 A | 12/1992 | Collier, IV et al. |
| 5,292,783 A | 3/1994 | Buchanan et al. |
| 5,382,611 A | 1/1995 | Stepto et al. |
| 5,397,834 A | 3/1995 | Jane et al. |
| 5,446,079 A | 8/1995 | Buchanan et al. |
| 5,470,944 A | 11/1995 | Bonsignore |
| 5,523,293 A | 6/1996 | Jane et al. |
| 5,559,171 A | 9/1996 | Buchanan et al. |
| 5,580,911 A | 12/1996 | Buchanan et al. |
| 5,599,858 A | 2/1997 | Buchanan et al. |
| 5,605,961 A | 2/1997 | Lee et al. |
| 5,641,562 A | 6/1997 | Larson et al. |
| 5,665,152 A | 9/1997 | Bassi et al. |
| 5,747,648 A | 5/1998 | Bassi et al. |
| 5,770,682 A | 6/1998 | Ohara et al. |
| 5,817,721 A | 10/1998 | Warzelhan et al. |
| 5,821,327 A | 10/1998 | Oota et al. |
| 5,880,254 A | 3/1999 | Ohara et al. |
| 5,900,322 A | 5/1999 | Buchanan et al. |
| 5,910,545 A | 6/1999 | Tsai et al. |
| 5,922,379 A | 7/1999 | Wang |
| 5,939,192 A | 8/1999 | Rettenbacher et al. |
| 5,945,480 A | 8/1999 | Wang et al. |
| 5,965,708 A | 10/1999 | Bassi et al. |
| 5,977,312 A | 11/1999 | Bassi et al. |
| 5,981,012 A | 11/1999 | Pomplun et al. |
| 5,985,396 A | 11/1999 | Kerins et al. |
| 6,008,276 A | 12/1999 | Kalbe et al. |
| 6,020,425 A | 2/2000 | Wang et al. |
| 6,063,866 A | 5/2000 | Wang et al. |

(Continued)

FOREIGN PATENT DOCUMENTS

EP    0565386 A1    10/1993

(Continued)

OTHER PUBLICATIONS

ASTM D 1238-04c—*Standard Test Method for Melt Flow Rates of Thermoplastics by Extrusion Plastometer*, Current edition approved Dec. 1, 2004, Originally approved in 1965, pp. 1-14.

(Continued)

*Primary Examiner* — David W Wu
*Assistant Examiner* — Robert Jones, Jr.
(74) *Attorney, Agent, or Firm* — Dority & Manning, P.A.

(57) ABSTRACT

A biodegradable packaging film is provided. The film is formed from a blend that contains a thermoplastic starch and polylactic acid. Starch is a relatively inexpensive natural polymer that is also renewable and biodegradable. Polylactic acid is likewise an inexpensive synthetic polymer that is biodegradable and renewable, yet also capable of providing increased tensile strength to the film. Although providing a good combination of biodegradability/renewability and increased tensile strength, the polylactic acid is also relatively rigid and can result in films having a relatively high stiffness (e.g., high modulus of elasticity) and low ductility. While more ductile than polylactic acid, the thermoplastic starch is often difficult to melt process in film forming processes and very sensitive to moisture and water vapor, reducing its ability to be used as a stand alone packaging film. In an effort to counteract the effect of such polymers, an aliphatic-aromatic copolyester is also employed in the blend of the present invention. While such copolyesters are biodegradable, they also possess the melt properties and ductility that lend them well to the formation of films. Although the combination of these polymers may achieve a good balance between biodegradability/renewability, high tensile strength, and good ductility (e.g., high peak elongation), it is still often difficult to achieve a precise set of mechanical properties as desired for packaging films. In this regard, the blend also contains a filler. Due to its rigid nature, the amount of the filler may be readily adjusted to fine tune the blend to the desired degree of ductility (e.g., peak elongation) and stiffness (e.g., modulus of elasticity).

28 Claims, 1 Drawing Sheet

U.S. PATENT DOCUMENTS

| | | | |
|---|---|---|---|
| 6,075,118 A | 6/2000 | Wang et al. | |
| 6,096,809 A * | 8/2000 | Lorcks et al. | 524/47 |
| 6,135,987 A | 10/2000 | Tsai et al. | |
| 6,225,388 B1 | 5/2001 | Tsai et al. | |
| 6,231,970 B1 | 5/2001 | Andersen et al. | |
| 6,235,816 B1 | 5/2001 | Lorcks et al. | |
| 6,258,924 B1 | 7/2001 | Warzelhan et al. | |
| 6,296,914 B1 | 10/2001 | Kerins et al. | |
| 6,297,347 B1 | 10/2001 | Warzelhan et al. | |
| 6,326,458 B1 | 12/2001 | Gruber et al. | |
| 6,350,518 B1 | 2/2002 | Schertz et al. | |
| 6,369,215 B1 | 4/2002 | Peltonen et al. | |
| 6,414,108 B1 | 7/2002 | Warzelhan et al. | |
| 6,417,312 B1 | 7/2002 | Kirchmeyer et al. | |
| 6,469,099 B1 | 10/2002 | Farah et al. | |
| 6,517,625 B2 | 2/2003 | Bassi et al. | |
| 6,530,910 B1 | 3/2003 | Pomplun et al. | |
| 6,544,455 B1 | 4/2003 | Tsai et al. | |
| 6,552,124 B2 | 4/2003 | Wang et al. | |
| 6,552,162 B1 | 4/2003 | Wang et al. | |
| 6,565,640 B1 | 5/2003 | Bengs et al. | |
| 6,605,367 B2 | 8/2003 | Bassi et al. | |
| 6,605,657 B1 | 8/2003 | Favis et al. | |
| 6,660,211 B2 | 12/2003 | Topolkaraev et al. | |
| 6,676,984 B1 | 1/2004 | Sharp et al. | |
| 6,703,115 B2 | 3/2004 | Hale et al. | |
| 6,709,671 B2 | 3/2004 | Zerbe et al. | |
| 6,713,595 B2 | 3/2004 | Chung et al. | |
| 6,746,705 B2 | 6/2004 | Altieri et al. | |
| 6,749,795 B2 | 6/2004 | Murphy | |
| 6,767,961 B1 | 7/2004 | Wang et al. | |
| 6,806,353 B2 | 10/2004 | Zhang et al. | |
| 6,838,403 B2 | 1/2005 | Tsai et al. | |
| 6,890,989 B2 | 5/2005 | Wang et al. | |
| 6,905,759 B2 | 6/2005 | Topolkaraev et al. | |
| 6,921,581 B2 | 7/2005 | Van Gelder et al. | |
| 6,933,335 B1 | 8/2005 | Berger et al. | |
| 6,946,506 B2 | 9/2005 | Bond et al. | |
| 6,958,371 B1 | 10/2005 | Wang et al. | |
| 6,984,426 B2 | 1/2006 | Miksic et al. | |
| 6,987,138 B2 | 1/2006 | Tokiwa et al. | |
| 7,045,650 B2 | 5/2006 | Lawrey et al. | |
| 7,053,151 B2 | 5/2006 | Wang et al. | |
| 7,077,994 B2 | 7/2006 | Bond et al. | |
| 7,098,292 B2 | 8/2006 | Zhao et al. | |
| 7,124,450 B2 | 10/2006 | Davidson | |
| 7,153,354 B2 | 12/2006 | Narayan et al. | |
| 7,153,569 B2 | 12/2006 | Kaufman et al. | |
| 7,235,594 B2 | 6/2007 | Han et al. | |
| 7,297,394 B2 | 11/2007 | Khemani et al. | |
| 7,307,125 B2 | 12/2007 | Chundury et al. | |
| 7,368,160 B2 | 5/2008 | Inglis | |
| 7,402,618 B2 | 7/2008 | Xu | |
| 7,413,731 B2 | 8/2008 | Heltovics et al. | |
| 2002/0098341 A1 | 7/2002 | Schiffer et al. | |
| 2003/0077395 A1 | 4/2003 | Bassi et al. | |
| 2003/0099692 A1 | 5/2003 | Lydzinski et al. | |
| 2003/0166779 A1* | 9/2003 | Khemani et al. | 525/178 |
| 2003/0232933 A1 | 12/2003 | Lagneaux et al. | |
| 2004/0034149 A1 | 2/2004 | Garcia | |
| 2004/0108611 A1 | 6/2004 | Dennis et al. | |
| 2005/0186256 A1 | 8/2005 | Dihel et al. | |
| 2005/0208294 A1 | 9/2005 | Kaufman et al. | |
| 2005/0244606 A1 | 11/2005 | Egawa | |
| 2006/0135728 A1 | 6/2006 | Peerlings et al. | |
| 2006/0149199 A1 | 7/2006 | Topolkaraev et al. | |
| 2007/0031555 A1 | 2/2007 | Axelrod et al. | |
| 2007/0049685 A1 | 3/2007 | Hansel et al. | |
| 2007/0049719 A1 | 3/2007 | Brauer et al. | |
| 2007/0129467 A1 | 6/2007 | Scheer | |
| 2007/0246867 A1 | 10/2007 | Nelson et al. | |
| 2007/0298237 A1 | 12/2007 | Goino et al. | |
| 2008/0147034 A1 | 6/2008 | Wang et al. | |
| 2009/0054548 A1 | 2/2009 | Wang et al. | |

FOREIGN PATENT DOCUMENTS

| | | |
|---|---|---|
| EP | 1235879 B1 | 5/2004 |
| EP | 1075188 B1 | 11/2005 |
| EP | 1837363 A1 | 9/2007 |
| WO | WO 0017270 A1 | 3/2000 |
| WO | WO 0136535 A1 | 5/2001 |
| WO | WO 0216468 A1 | 2/2002 |
| WO | WO 02053376 A2 | 7/2002 |
| WO | WO 02053376 A3 | 7/2002 |
| WO | WO 02059199 A1 | 8/2002 |
| WO | WO 02078944 A1 | 10/2002 |
| WO | WO 2005113616 A2 | 12/2005 |
| WO | WO 2005113616 A3 | 12/2005 |

OTHER PUBLICATIONS

ASTM D 1343-56—*Standard Method of Test for Viscosity of Cellulose Derivatives by Ball-Drop Method*, Adopted 1956, pp. 486-489.

ASTM D 1505-03—*Standard Test Method for Density of Plastics by the Density-Gradient Technique*, Current edition approved Nov. 1, 2003, Originally approved in 1957, pp. 1-7.

ASTM D 1525-07—*Standard Test Method for Vicat Softening Temperature of Plastics*, Current edition approved Mar. 1, 2007, Originally approved in 1958, pp. 1-9.

Astm D 3418-03 (D 3417-99)—*Standard Test Method for Transition Temperatures and Enthalpies of Fusion and Crystallization of Polymers by Differential Scanning Calorimetry*, Current edition approved Dec. 1, 2003, Originally approved in 1976, pp. 66-72.

ASTM D 3806-98 (Reapproved 2004)—*Standard Test Method of Small-Scale Evaluation of Fire-Retardant Paints (2-Foot Tunnel Method)*, Current edition approved Jun. 1, 2004, Originally approved in 1979, pp. 1-6.

ASTM D 5034-95—*Standard Test Method for Breaking Strength and Elongation of Textile Fabrics (Grab Test)*, Current edition approved May 15, 1995, pp. 674-681.

ASTM D 5338-92—*Standard Test Method for Determining Aerobic Biodegradation of Plastic Materials Under Controlled Composting Conditions*, Current edition approved Dec. 15, 1992, pp. 456-461.

ASTM D 638-08—*Standard Test Method for Tensile Properties of Plastics*, Current edition approved Apr. 1, 2008, Originally approved in 1941, pp. 1-16.

ASTM D 790-99—*Standard Test Methods for Flexural Properties of Unreinforced and Reinforced Plastics and Electrical Insulating Materials*, Current edition approved Nov. 10, 1999, pp. 150-158.

Article—*Aging Properties of Films of Plasticized Vital Wheat Gluten Cast from Acidic and Basic Solutions*, Olabarrieta et al., Biomacromolecules, vol. 7, No. 5, 2006, pp. 1657-1664.

Article—*Biodegradable Compositions by Reactive Processing of Aliphatic Polyester/Polysaccharide Blends*, Dubois et al., Macromol. Symp., vol. 198, 2003, pp. 233-243.

Article—*Biodegradable Soy Protein-Polyester Blends by Reactive Extrusion Process*, Graiver et al., Journal of Applied Polymer Science, vol. 92, 2004, pp. 3231-3239.

Article—*Chemical Modification of Starch*, Tomasik et al., Advances in Carbohydrate Chemistry and Biochemistry, vol. 59, 2004, pp. 175-316.

Article—*Edible Protein Films and Coatings*, Food Proteins and Their Applications edited by S. Damodaran and A. Paraf, John M. Krochta, 1997, pp. 529-539.

Article—*Effects of Extruder Die Nozzle Dimensions on Expansion Micrographic Characterization During Extrusion of Acetylated Starch*, Genjyal et al., Starch/Stärke, vol. 56, 2004, pp. 108-117.

Article—*Extrusion of Wheat Gluten Plasticized with Glycerol: Influence of Process Conditions on Flow Behavior, Rheological Properties and Molecular Size Distribution*, Redl et al., Cereal Chemistry, vol. 76, No. 3, 1999, pp. 361-370.

Article—*Glycol Glucosides from Starch by Continuous Twin-Screw Extruder Processing*, Carr et al., Cereal Chemistry, vol. 66, No. 3, 1989, pp. 238-243.

Article—*Heat and shear mediated polymerization of plasticized wheat gluten protein upon mixing*, Redl et al., Journal of Cereal Science 38, 2003, pp. 105-114.

Article—*Polyurethane/Polyolefin Blends: Morphology, Compatibilization and Mechanical Properties*, Wang et al., Polymers & Polymer Composites, vol. 14, No. 1, 2006, 11 pages.

Article—*Preparation of Acetylated Distarch Adipates by Extrusion*, Mail et al., Lebensmittel-Wissenschaft und-Technologie, vol. 34, No. 6, 2001, pp. 384-389.

Article—*Reactivity of Wheat Gluten Protein during Mechanical Mixing: Radical and Nucleophilic Reactions for the Addition of Molecules on Sulfur*, Auvergne et al., Biomacromolecules, vol. 9, No. 2, 2008, pp. 664-671.

Article—*Soy Protein-Based Biodegradable Plastics*, Mungara et al., Proceedings in Plastics Impact on the Environment Conference, Society of Plastic, Feb. 2003, pp. 393-397.

Article—*Starch Modification, Destruction and Hydrolysis during O-Formylation*, Divers et al., Starch/Stärke 56, 2004, pp. 389-398.

Article—*The chemical modification of a range of starches under aqueous reaction conditions*, Fang et al., Carbohydrate Polymers 55, 2004, pp. 283-289.

Article—*The History of Tomorrow's Materials: Protein-Based Biopolymers*, Ralston et al., Plastics Engineering, Feb. 2008, pp. 36-40.

Article—*The Hydroxypropylation of Starch in a Self-Wiping Twin Screw Extruder*, De Graaf et al., Advances in Polymer Technology, vol. 22, No. 1, 2003, pp. 56-68.

Article—*Thermoplastic Processing of Protein-Based Bioplastics: Chemical Engineering Aspects of Mixing, Extrusion and Hot Molding*, Pommet et al., Macromol. Symp., vol. 197, 2003, pp. 207-217.

Article—*Thermoplastic Processing of Proteins for Film Formation—A Review*, Hernandez-Izquierdo et al., Journal of Food Science, vol. 73, No. 2, 2008, pp. R30-R39.

Related U.S. Patent Applications.

Abstract of Japanese Patent No. JP2006137847 dated Jun. 1, 2006, 1 page.

Abstract of Japanese Patent No. JP2006505719 dated Feb. 16, 2006, 1 page.

Abstract of Japanese Patent No. JP2003082140 dated Mar. 19, 2003, 1 page.

Abstract of Japanese Patent No. JP2004147613 dated May 27, 2004, 1 page.

Abstract of Japanese Patent No. JP2006205599 dated Aug. 10, 2006, 1 page.

Search Report and Written Opinion for PCT/IB2009/052014 dated Jan. 29, 2010, 14 pages.

Annex to the European Search Report on European Patent Application No. EP 09 77 2928 dated Oct. 4, 2011, 6 pages.

* cited by examiner

BIODEGRADABLE PACKAGING FILM

BACKGROUND OF THE INVENTION

Packaging films, such as those used in the food industry, are often formed from synthetic polymers, such as polyvinyl chloride, polyamide, polyethylene, and polyvinyl alcohol. One disadvantage of these films is that the synthetic polymers are not biodegradable. Because of the lack of environmental safety and high disposal costs, various attempts have been made to replace these materials with relatively inexpensive biodegradable and renewable materials, such as starch and polylactic acid. Unfortunately, however, processing of these materials is much more difficult than that of synthetic polymers. Starch and polylactic acid, for instance, are very rigid polymers that generally result in films have a substantial degree of stiffness, making them difficult to process and use in packaging applications. As such, a need exists for a packaging film that is biodegradable, and yet possess good flexibility and mechanical properties.

SUMMARY OF THE INVENTION

In accordance with one embodiment of the present invention, a biodegradable packaging film is disclosed. The film includes a blend that comprises at least one thermoplastic starch in an amount of from about 10 wt. % to about 60 wt. % of the blend, at least one polylactic acid in an amount of from about 1 wt. % to about 30 wt. % of the blend, at least one aliphatic-aromatic copolyester in an amount of from about 20 wt. % to about 70 wt. % of the blend, and at least one filler in an amount of from about 1 wt. % to about 25 wt. % of the blend. The ratio of the total weight percentage of the aliphatic-aromatic copolyester and thermoplastic starch to the total weight percentage of the polylactic acid and filler is from about 1 to about 10.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Repeat use of references characters in the present specification and drawing is intended to represent same or analogous features or elements of the invention.

DETAILED DESCRIPTION OF REPRESENTATIVE EMBODIMENTS

Definitions

As used herein, the term "biodegradable" generally refers to a material that degrades from the action of naturally occurring microorganisms, such as bacteria, fungi, and algae; environmental heat; moisture; or other environmental factors. If desired, the extent of biodegradability may be determined according to ASTM Test Method 5338.92.

Detailed Description

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a biodegradable film that is generally intended for use in the packaging of items, such as food products, medical products, garments, garbage, absorbent articles (e.g., diapers), tissue products, and so forth. The film is formed from a blend that contains a thermoplastic starch and polylactic acid. Starch is a relatively inexpensive natural polymer that is also renewable and biodegradable. Polylactic acid is likewise an inexpensive synthetic polymer that is biodegradable and renewable, yet also capable of providing increased tensile strength to the film. Although providing a good combination of biodegradability/renewability and increased tensile strength, the polylactic acid is also relatively rigid and can result in films having a relatively high stiffness (e.g., high modulus of elasticity) and low ductility. While more ductile than polylactic acid, the thermoplastic starch is often difficult to melt process in film forming processes and very sensitive to moisture and water vapor, reducing its ability to be used as a stand alone packaging film. In an effort to counteract the effect of such polymers, an aliphatic-aromatic copolyester is also employed in the blend of the present invention. While such copolyesters are biodegradable, they also possess the melt properties and ductility that lend them well to the formation of films. Although the combination of these polymers may achieve a good balance between biodegradability/renewability, high tensile strength, and good ductility (e.g., high peak elongation), it is still often difficult to achieve a precise set of mechanical properties as desired for packaging films. In this regard, the blend also contains a filler. Due to its rigid nature, the amount of the filler may be readily adjusted to fine tune the blend to the desired degree of ductility (e.g., peak elongation) and stiffness (e.g., modulus of elasticity).

Taking into consideration all of the factors mentioned above, the present inventors have discovered that the thermoplastic starch, polylactic acid, aliphatic-aromatic copolyester, and filler, when employed in appropriate amounts, can operate together to achieve a synergistic combination of biodegradability/renewability and excellent thermal and mechanical properties for forming a biodegradable packaging film. In this regard, the blend of the present invention contains at least one thermoplastic starch in an amount from about 10 wt. % to about 60 wt. %, in some embodiments, from about 15 wt. % to about 55 wt. %, and in some embodiments, from about 20 wt. % to about 50 wt. % of the blend; at least one polylactic acid in an amount from about 1 wt. % to about 30 wt. %, in some embodiments, from about 2 wt. % to about 25 wt. %, and in some embodiments, from about 5 wt. % to about 25 wt. % of the blend; at least one aliphatic-aromatic copolyester in an amount from about 20 wt. % to about 70 wt. %, in some embodiments, from about 25 wt. % to about 65 wt. %, and in some embodiments, from about 30 wt. % to about 60 wt. % of the blend; and at least one filler in an amount from about 1 wt. % to about 25 wt. %, in some embodiments, from about 5 wt. % to about 20 wt. %, and in some embodiments, from about 8 wt. % to about 15 wt. % of the blend.

Within these weight percentages, the proportion of the ductile components (e.g., aliphatic-aromatic copolyester and thermoplastic starch) relative to the rigid components (e.g., polylactic acid and filler) may also be controlled to enhance the balance between biodegradability/renewability and the thermal and mechanical properties of the film. Namely, as the ratio of the ductile/rigid components decreases, the modulus of elasticity tends to increase and the peak elongation tends to decrease. Conversely, as the ratio of the ductile/rigid components increases, the modulus of elasticity tends to decrease and the peak elongation tends to increase. In this regard, the present inventors have discovered that an optimal balance between ductility and rigidity may be achieved when the ratio of the total weight percentage of the aliphatic-aromatic copolyester(s) and thermoplastic starch(es) to the total weight percentage of the polylactic acid(s) and filler(s) may be controlled within a range of from about 1 to about 10, in some embodiments from about 1.5 to about 8, and in some embodiments, from about 2 to about 6.

Various embodiments of the present invention will now be described in more detail below.

I. Film Components

A. Thermoplastic Starch

Starch is a natural polymer composed of amylose and amylopectin. Amylose is essentially a linear polymer having a molecular weight in the range of 100,000-500,000, whereas amylopectin is a highly branched polymer having a molecular weight of up to several million. Although starch is produced in many plants, typical sources includes seeds of cereal grains, such as corn, waxy corn, wheat, sorghum, rice, and waxy rice; tubers, such as potatoes; roots, such as tapioca (i.e., cassava and manioc), sweet potato, and arrowroot; and the pith of the sago palm. Broadly speaking, any natural (unmodified) and/or modified starch may be employed in the present invention. Modified starches, for instance, are often employed that have been chemically modified by typical processes known in the art (e.g., esterification, etherification, oxidation, acid hydrolysis, enzymatic hydrolysis, etc.). Starch ethers and/or esters may be particularly desirable, such as hydroxyalkyl starches, carboxymethyl starches, etc. The hydroxyalkyl group of hydroxyalkyl starches may contain, for instance, 2 to 10 carbon atoms, in some embodiments from 2 to 6 carbon atoms, and in some embodiments, from 2 to 4 carbon atoms. Representative hydroxyalkyl starches such as hydroxyethyl starch, hydroxypropyl starch, hydroxybutyl starch, and derivatives thereof. Starch esters, for instance, may be prepared using a wide variety of anhydrides (e.g., acetic, propionic, butyric, and so forth), organic acids, acid chlorides, or other esterification reagents. The degree of esterification may vary as desired, such as from 1 to 3 ester groups per glucosidic unit of the starch.

Regardless of whether it is in a native or modified form, the starch may contain different percentages of amylose and amylopectin, different size starch granules and different polymeric weights for amylose and amylopectin. High amylose starches contain greater than about 50% by weight amylose and low amylose starches contain less than about 50% by weight amylose. Although not required, low amylose starches having an amylose content of from about 10% to about 40% by weight, and in some embodiments, from about 15% to about 35% by weight, are particularly suitable for use in the present invention. Examples of such low amylose starches include corn starch and potato starch, both of which have an amylose content of approximately 20% by weight. Such low amylose starches typically have a number average molecular weight ("$M_n$") ranging from about 50,000 to about 1,000,000 grams per mole, in some embodiments from about 75,000 to about 800,000 grams per mole, and in some embodiments, from about 100,000 to about 600,000 grams per mole, as well as a weight average molecular weight ("$M_w$") ranging from about 5,000,000 to about 25,000,000 grams per mole, in some embodiments from about 5,500,000 to about 15,000,000 grams per mole, and in some embodiments, from about 6,000,000 to about 12,000,000 grams per mole. The ratio of the weight average molecular weight to the number average molecular weight ("$M_w/M_n$"), i.e., the "polydispersity index", is also relatively high. For example, the polydispersity index may range from about 20 to about 100. The weight and number average molecular weights may be determined by methods known to those skilled in the art.

A plasticizer is also employed in the thermoplastic starch to help render the starch melt-processible. Starches, for instance, normally exist in the form of granules that have a coating or outer membrane that encapsulates the more water-soluble amylose and amylopectin chains within the interior of the granule. When heated, plasticizers may soften and penetrate the outer membrane and cause the inner starch chains to absorb water and swell. This swelling will, at some point, cause the outer shell to rupture and result in an irreversible destructurization of the starch granule. Once destructurized, the starch polymer chains containing amylose and amylopectin polymers, which are initially compressed within the granules, will stretch out and form a generally disordered intermingling of polymer chains. Upon resolidification, however, the chains may reorient themselves to form crystalline or amorphous solids having varying strengths depending on the orientation of the starch polymer chains. Because the starch is thus capable of melting and resolidifying at certain temperatures, it is generally considered a "thermoplastic starch."

Suitable plasticizers may include, for instance, polyhydric alcohol plasticizers, such as sugars (e.g., glucose, sucrose, fructose, raffinose, maltodextrose, galactose, xylose, maltose, lactose, mannose, and erythrose), sugar alcohols (e.g., erythritol, xylitol, malitol, mannitol, and sorbitol), polyols (e.g., ethylene glycol, glycerol, propylene glycol, dipropylene glycol, butylene glycol, and hexane triol), etc. Also suitable are hydrogen bond forming organic compounds which do not have hydroxyl group, including urea and urea derivatives; anhydrides of sugar alcohols such as sorbitan; animal proteins such as gelatin; vegetable proteins such as sunflower protein, soybean proteins, cotton seed proteins; and mixtures thereof. Other suitable plasticizers may include phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, and other acid esters. Aliphatic acids may also be used, such as copolymers of ethylene and acrylic acid, polyethylene grafted with maleic acid, polybutadiene-co-acrylic acid, polybutadiene-co-maleic acid, polypropylene-co-acrylic acid, polypropylene-co-maleic acid, and other hydrocarbon based acids. A low molecular weight plasticizer is preferred, such as less than about 20,000 g/mol, preferably less than about 5,000 g/mol and more preferably less than about 1,000 g/mol.

The relative amount of starches and plasticizers employed in the thermoplastic starch may vary depending on a variety of factors, such as the desired molecular weight, the type of starch, the affinity of the plasticizer for the starch, etc. Typically, however, starches constitute from about 30 wt. % to about 95 wt. %, in some embodiments from about 40 wt. % to about 90 wt. %, and in some embodiments, from about 50 wt. % to about 85 wt. % of the thermoplastic starch. Likewise, plasticizers typically constitute from about 5 wt. % to about 55 wt. %, in some embodiments from about 10 wt. % to about 45 wt. %, and in some embodiments, from about 15 wt. % to about 35 wt. % of the thermoplastic composition. It should be understood that the weight of starch referenced herein includes any bound water that naturally occurs in the starch before mixing it with other components to form the thermoplastic starch. Starches, for instance, typically have a bound water content of about 5% to 16% by weight of the starch.

Of course, other additives may also be employed in the thermoplastic starch to facilitate its use in various types of fibers. Dispersion aids, for instance, may be employed to help create a uniform dispersion of the starch/plasticizer mixture and retard or prevent separation of the thermoplastic starch into constituent phases. When employed, the dispersion aid(s) typically constitute from about 0.01 wt. % to about 10 wt. %, in some embodiments from about 0.1 wt. % to about 5 wt. %, and in some embodiments, from about 0.5 wt. % to about 4 wt. % of the thermoplastic starch.

Although any dispersion aid may generally be employed in the present invention, surfactants having a certain hydrophilic/lipophilic balance ("HLB") may improve the long-term stability of the composition. The HLB index is well known in the art and is a scale that measures the balance between the hydrophilic and lipophilic solution tendencies of a compound. The HLB scale ranges from 1 to approximately 50, with the lower numbers representing highly lipophilic tendencies and the higher numbers representing highly hydrophilic tendencies. In some embodiments of the present invention, the HLB value of the surfactants is from about 1 to about 20, in some embodiments from about 1 to about 15 and in some embodiments, from about 2 to about 10. If desired, two or more surfactants may be employed that have HLB values either below or above the desired value, but together have an average HLB value within the desired range.

One particularly suitable class of surfactants for use in the present invention are nonionic surfactants, which typically have a hydrophobic base (e.g., long chain alkyl group or an alkylated aryl group) and a hydrophilic chain (e.g., chain containing ethoxy and/or propoxy moieties). For instance, some suitable nonionic surfactants that may be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty ($C_8$-$C_{18}$) acids, condensation products of ethylene oxide with long chain amines or amides, condensation products of ethylene oxide with alcohols, fatty acid esters, monoglyceride or diglycerides of long chain alcohols, and mixtures thereof. In one particular embodiment, the nonionic surfactant may be a fatty acid ester, such as a sucrose fatty acid ester, glycerol fatty acid ester, propylene glycol fatty acid ester, sorbitan fatty acid ester, pentaerythritol fatty acid ester, sorbitol fatty acid ester, and so forth. The fatty acid used to form such esters may be saturated or unsaturated, substituted or unsubstituted, and may contain from 6 to 22 carbon atoms, in some embodiments from 8 to 18 carbon atoms, and in some embodiments, from 12 to 14 carbon atoms. In one particular embodiment, mono- and di-glycerides of fatty acids may be employed in the present invention.

Regardless of the particular manner in which it is formed, the thermoplastic starch typically has an apparent viscosity of from about 25 to about 500 Pascal seconds (Pa·s), in some embodiments from about 50 to about 400 Pa·s, and in some embodiments, from about 100 to about 300 Pa·s, as determined at a temperature of 150° C. and a shear rate of 1000 sec$^{-1}$. The melt flow index (190° C., 2.16 kg) of the thermoplastic starch may also range from about 0.05 to about 50 grams per 10 minutes, in some embodiments from about 0.1 to about 15 grams per 10 minutes, and in some embodiments, from about 0.5 to about 5 grams per 10 minutes.

B. Polylactic Acid

Polylactic acid may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the rate of content of one of the monomer unit derived from L-lactic acid and the monomer unit derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Of course, polylactic acid may also be blended with other types of polymers (e.g., polyolefins, polyesters, etc.) to provided a variety of different of benefits, such as processing, fiber formation, etc.

In one particular embodiment, the polylactic acid has the following general structure:

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minn. (NATUREWORKS®) or Mitsui Chemical (LACEA™). Still other suitable polylactic acids may be described in U.S. Pat. Nos. 4,797,468; 5,470,944; 5,770,682; 5,821,327; 5,880,254; and 6,326,458, which are incorporated herein in their entirety by reference thereto for all purposes.

The polylactic acid typically has a number average molecular weight ("$M_n$") ranging from about 40,000 to about 160,000 grams per mole, in some embodiments from about 50,000 to about 140,000 grams per mole, and in some embodiments, from about 80,000 to about 120,000 grams per mole. Likewise, the polymer also typically has a weight average molecular weight ("$M_w$") ranging from about 80,000 to about 200,000 grams per mole, in some embodiments from about 100,000 to about 180,000 grams per mole, and in some embodiments, from about 110,000 to about 160,000 grams per mole. The polydispersity index is also relatively low, such as from about 1.0 to about 3.0, in some embodiments from about 1.1 to about 2.0, and in some embodiments, from about 1.2 to about 1.8.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 sec$^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes. The melt flow rate is the weight of a polymer (in grams) that may be forced through an extrusion rheometer orifice (0.0825-inch diameter) when subjected to a load of 2160 grams in 10 minutes at a certain temperature (e.g., 190° C.), measured in accordance with ASTM Test Method D1238-E.

The polylactic acid also typically has a melting point of from about 100° C. to about 240° C., in some embodiments from about 120° C. to about 220° C., and in some embodiments, from about 140° C. to about 200° C. Such polylactic acids are useful in that they biodegrade at a fast rate. The glass transition temperature ("$T_g$") of the polylactic acid may be relatively high, such as from about 10° C. to about 80° C., in some embodiments from about 20° C. to about 70° C., and in some embodiments, from about 25° C. to about 65° C. The melting temperature and glass transition temperature may all be determined using differential scanning calorimetry ("DSC") in accordance with ASTM D-3417.

C. Aliphatic-Aromatic Copolyester

The aliphatic-aromatic copolyester may be synthesized using any known technique, such as through the condensation polymerization of a polyol in conjunction with aliphatic and aromatic dicarboxylic acids, esters, or anhydrides thereof. The polyols may be substituted or unsubstituted, linear or branched, polyols selected from polyols containing 2 to about 12 carbon atoms and polyalkylene ether glycols containing 2 to 8 carbon atoms. Examples of polyols that may be used include, but are not limited to, ethylene glycol, diethylene glycol, propylene glycol, 1,2-propanediol, 1,3-propanediol, 2,2-dimethyl-1,3-propanediol, 1,2-butanediol, 1,3-butanediol, 1,4-butanediol, 1,2-pentanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, cyclopentanediol, triethylene glycol, and tetraethylene glycol. Preferred polyols include 1,4-butanediol; 1,3-propanediol; ethylene glycol; 1,6-hexanediol; diethylene glycol; and 1,4-cyclohexanedimethanol.

The aromatic dicarboxylic acid may include, for instance, terephthalic acid phthalic acid, isophthalic acid, etc., and derivatives thereof, including esters (e.g., monoesters, diesters, etc.), anhydrides (e.g., terephthalic anhydride), and so forth. Suitable esters of terephthalic acid may include alkyl, cycloalkyl and alkoxyalkyl terephthalates, where the alkyl, cycloalkyl and alkoxyalkyl groups generally have from 1 to 30, preferably from 2 to 20 and particularly preferably from 3 to 18, carbon atoms and may be branched or linear. Examples of suitable alkyl terephthalates include, for instance, monomethyl terephthalate, dimethyl terephthalate, diethyl terephthalate, di-n-propyl terephthalate, di-n-butyl terephthalate, di-tert-butyl terephthalate, diisobutyl terephthalate, monoglycol esters of terephthalic acid, diglycol esters of terephthalic acid, di-n-octyl terephthalate, diisooctyl terephthalate, mono-2-ethylhexyl terephthalate, di-2-ethylhexyl terephthalate, di-n-nonyl terephthalate, diisononyl terephthalate, di-n-decyl terephthalate, di-n-undecyl terephthalate, diisodecyl terephthalate, diisoundecyl terephthalate, diisododecyl terephthalate, di-n-octadecyl terephthalate, diisooctadecyl terephthalate, di-n-eicosyl terephthalate, ditridecyl terephthalate, diisotridecyl terephthalate, monocyclohexyl terephthalate, dicyclohexyl terephthalate, etc. Suitable esters of phthalic and/or isophthalic acid may include alkyl, cycloalkyl and alkoxyalkyl phthalates and/or isophthalates, where the alkyl, cycloalkyl and alkoxyalkyl groups generally have from 1 to 30, preferably from 2 to 20 and particularly preferably from 3 to 18, carbon atoms and may be branched or linear. Examples of suitable alkyl phthalates include, for instance, monomethyl phthalate, dimethyl phthalate, diethyl phthalate, di-n-propyl phthalate, di-n-butyl phthalate, di-tert-butyl phthalate, diisobutyl phthalate, monoglycol esters of phthalic acid, diglycol esters of phthalic acid, di-n-octyl phthalate, diisooctyl phthalate, di-2-ethylhexyl phthalate, di-n-nonyl phthalate, diisononyl phthalate, di-n-decyl phthalate, diisodecyl phthalate, di-n-undecyl phthalate, di-isoundecyl phthalate, diisododecyl phthalate, di-n-octadecyl phthalate, diisooctadecyl phthalate, di-n-eicosyl phthalate, monocyclohexyl phthalate, dicyclohexyl phthalate, etc. Likewise, suitable isophthalates may include monomethyl isophthalate, dimethyl isophthalate, diethyl isophthalate, di-n-propyl isophthalate, di-n-butyl isophthalate, di-tert-butyl isophthalate, diisobutyl isophthalate, monoglycol esters of isophthalic acid, diglycol esters of isophthalic acid, di-n-octyl isophthalate, diisooctyl isophthalate, di-2-ethylhexyl isophthalate, di-n-nonyl isophthalate, diisononyl isophthalate, di-n-decyl isophthalate, diisodecyl isophthalate, di-n-undecyl isophthalate, di-isoundecyl isophthalate, diisododecyl isophthalate, di-n-octadecyl isophthalate, diisooctadecyl isophthalate, di-n-eicosyl isophthalate, monocyclohexyl isophthalate, dicyclohexyl isophthalate, and so forth.

Non-limiting examples of aliphatic dicarboxylic acids include malonic, malic, succinic, oxalic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornanedicarboxylic. Representative aromatic dicarboxylic acids that may be used include substituted and unsubstituted, linear or branched, aromatic dicarboxylic acids selected from aromatic dicarboxylic acids containing 8 or more carbon atoms, and derivatives thereof. Non-limiting examples of aromatic dicarboxylic acids include terephthalic acid, isophthalic acid, phthalic acid, napthalic acid, as well as derivatives thereof, such as dimethyl terephthalate, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), etc., and mixtures thereof.

The aromatic dicarboxylic acid monomer constituent may be present in the copolyester in an amount of from about 10 mole % to about 45 mole %, in some embodiments from about 15 mole % to about 35 mole %, and in some embodiments, from about 15 mole % to about 30 mole %. The aliphatic dicarboxylic acid monomer constituent may likewise be present in the copolyester in an amount of from about 15 mole % to about 45 mole %, in some embodiments from about 20 mole % to about 40 mole %, and in some embodiments, from about 25 mole % to about 35 mole %. The polyol monomer constituent may be present in the second copolyester in an amount of from about 30 mole % to about 65 mole %, in some embodiments from about 40 mole % to about 50 mole %, and in some embodiments, from about 45 mole % to about 55 mole %.

If desired, a diisocyanate chain extender may be reacted with the copolyester to increase its molecular weight. Representative diisocyanates may include toluene 2,4-diisocyanate, toluene 2,6-diisocyanate, 2,4'-diphenylmethane diisocyanate, naphthylene-1,5-diisocyanate, xylylene diisocyanate, hexamethylene diisocyanate ("HMDI"), isophorone diisocyanate and methylenebis(2-isocyanatocyclohexane). Trifunctional isocyanate compounds may also be employed that contain isocyanurate and/or biurea groups with a functionality of not less than three, or to replace the diisocyanate compounds partially by tri- or polyisocyanates. The preferred diisocyanate is hexamethylene diisocyanate. The amount of the chain extender employed is typically from about 0.3 to about 3.5 wt. %, in some embodiments, from about 0.5 to about 2.5 wt. % based on the total weight percent of the polymer.

The copolyesters may either be a linear polymer or a long-chain branched polymer. Long-chain branched polymers are generally prepared by using a low molecular weight branching agent, such as a polyol, polycarboxylic acid, hydroxy acid, and so forth. Representative low molecular weight polyols that may be employed as branching agents include glycerol, trimethylolpropane, trimethylolethane, polyethertriols, 1,2,4-butanetriol, pentaerythritol, 1,2,6-hexanetriol, sorbitol, 1,1,4,4,-tetrakis(hydroxymethyl)cyclohexane, tris(2-hydroxyethyl)isocyanurate, and dipentaerythritol. Representative higher molecular weight polyols (molecular weight of 400 to 3000) that may be used as branching agents include triols derived by condensing alkylene oxides having 2 to 3 carbons, such as ethylene oxide and propylene oxide with polyol initiators. Representative polycarboxylic acids that may be used as branching agents include hemimellitic acid, trimellitic(1,2,4-benzenetricarboxylic) acid and anhydride, trimesic(1,3,5-benzenetricarboxylic) acid, pyromellitic acid and anhydride, benzenetetracarboxylic acid, benzophenone tetracarboxylic acid, 1,1,2,2-ethane-tetracarboxylic acid, 1,1,2-ethanetricarboxylic acid, 1,3,5-pentanetricarboxylic acid, and 1,2,3,4-cyclopentanetetracarboxylic acid. Representative hydroxy acids that may be used as branching agents include malic acid, citric acid, tartaric acid, 3-hydroxyglutaric acid, mucic acid, trihydroxyglutaric acid, 4-carboxyphthalic anhydride, hydroxyisophthalic acid, and 4-(beta-hydroxyethyl)phthalic acid. Such hydroxy acids contain a combination of 3 or more hydroxyl and carboxyl groups. Especially preferred branching agents include trimellitic acid, trimesic acid, pentaerythritol, trimethylol propane and 1,2,4-butanetriol.

In one particular embodiment, for example, the aliphatic-aromatic copolyester may comprise the following structure:

wherein,
m is an integer from 2 to 10, in some embodiments from 2 to 4, and in one embodiment, 4;
n is an integer from 0 to 18, in some embodiments from 2 to 4, and in one embodiment, 4;
p is an integer from 2 to 10, in some embodiments from 2 to 4, and in one embodiment, 4;
x is an integer greater than 1, and in some embodiments, from 2 to 100; and
y is an integer greater than 1, and in some embodiments from 2 to 100. One example of such a copolyester is polybutylene adipate terephthalate, which is commercially available under the designation ECOFLEX® F BX 7011 from BASF Corp. Another example of a suitable copolyester containing an aromatic terephthalic acid monomer constituent is available under the designation ENPOL™ 8060M from IRE Chemicals (South Korea). Other suitable aliphatic-aromatic copolyesters may be described in U.S. Pat. Nos. 5,292,783; 5,446,079; 5,559,171; 5,580,911; 5,599,858; 5,817,721; 5,900,322; and 6,258,924, which are incorporated herein in their entirety by reference thereto for all purposes.

The aliphatic-aromatic copolyester typically has a number average molecular weight ("$M_n$") ranging from about 40,000 to about 120,000 grams per mole, in some embodiments from about 50,000 to about 100,000 grams per mole, and in some embodiments, from about 60,000 to about 85,000 grams per mole. Likewise, the polymer also typically has a weight average molecular weight ("$M_w$") ranging from about 70,000 to about 360,000 grams per mole, in some embodiments from about 80,000 to about 250,000 grams per mole, and in some embodiments, from about 100,000 to about 200,000 grams per mole. The polydispersity index is also relatively low, such as from about 1.0 to about 3.0, in some embodiments from about 1.2 to about 2.0, and in some embodiments, from about 1.4 to about 1.8. The melt flow index of the aromatic-aliphatic polyester may also range from about 0.1 to about 10 grams per 10 minutes, in some embodiments from about 0.5 to about 8 grams per 10 minutes, and in some embodiments, from about 1 to about 5 grams per 10 minutes. The melt flow index is the weight of a polymer (in grams) that may be forced through an extrusion rheometer orifice (0.0825-inch diameter) when subjected to a load of 2160 grams in 10 minutes at a certain temperature (e.g., 190° C.), measured in accordance with ASTM Test Method D1238-E.

The aliphatic-aromatic copolyester also typically has a melting point of from about 80° C. to about 140° C., in some embodiments from about 90° C. to about 130° C., and in some embodiments, from about 100° C. to about 120° C. The glass transition temperature ("$T_g$") of the copolyester is also relatively low to improve flexibility and processability of the polymers. For example, the $T_g$ may be about 25° C. or less, in some embodiments about 0° C. or less, and in some embodiments, about −10° C. or less. The melting temperature and glass transition temperature may be determined using differential scanning calorimetry ("DSC") in accordance with ASTM D-3417.

D. Filler

The filler of the present invention may include particles having any desired size, such as those having an average size of from about 0.5 to about 10 micrometers, in some embodiments, from about 1 to about 8 micrometers, and in some embodiments, from about 2 to about 6 micrometers. Suitable particles for use as a filler may include inorganic oxides, such as calcium carbonate, kaolin clay, silica, alumina, barium carbonate, sodium carbonate, titanium dioxide, zeolites, magnesium carbonate, calcium oxide, magnesium oxide, aluminum hydroxide, talc, etc.; sulfates, such as barium sulfate, magnesium sulfate, aluminum sulfate, etc.; cellulose-type powders (e.g., pulp powder, wood powder, etc.); carbon; cyclodextrins; synthetic polymers (e.g., polystyrene), and so forth. Still other suitable particles are described in U.S. Pat. Nos. 6,015,764 and 6,111,163 to McCormack, et al.; U.S. Pat. No. 5,932,497 to Morman, et al.; U.S. Pat. No. 5,695,868 to McCormack; U.S. Pat. No. 5,855,999 to McCormack, et al.; U.S. Pat. No. 5,997,981 to McCormack et al.; and U.S. Pat. No. 6,461,457 to Taylor, et al., which are incorporated herein in their entirety by reference thereto for all purposes.

In one particular embodiment, the filler includes particles formed from calcium carbonate. If desired, calcium carbonate particles may be employed that have a purity of at least about 95 wt. %, in some embodiments at least about 98 wt. %, and in some embodiments, at least about 99 wt. %. Such high purity calcium carbonates are generally fine, soft, and round, and thus provide a more controlled and narrow particle size for improving the properties of the film. An example of such a high purity calcium carbonate is Caribbean micritic calcium carbonate, which is mined from soft and friable, finely divided, chalk-like marine sedimentary deposits frequently occurring as surface deposits in the Caribbean (e.g., Jamaica). Such calcium carbonates typically have an average particle size of about 10 micrometers or less, and desirably about 6 micrometers or less. Other examples of Caribbean micritic calcium carbonates are described in U.S. Pat. No. 5,102,465 to Lamond, which is incorporated herein in its entirety by reference thereto for all purposes. Such calcium carbonates may be wet or dry ground, and classified into a narrow particle size distribution with round or spherical-shaped particles. One particularly suitable micritic calcium carbonate is available from Specialty Minerals under the designation "MD1517."

Although not required, the filler may optionally be coated with a modifier (e.g., fatty acid, such as stearic acid or behenic acid) to facilitate the free flow of the particles in bulk and their ease of dispersion into the biodegradable polymer. Further, the filler may also be coated with a liquid additive to reduce coupling at the resin-filler interface and facilitate debonding of filler from polymer matrix during stretching. This is especially useful for the polar biodegradable polymers, which demonstrate strong interaction with fillers. Examples of such additives include surfactants, such as silicone glycol copolymers available from Dow Corning Corporation. Other suitable additives for this purpose may include titanates available from Kenrich Petrochemicals, Inc. of Bayonne, N.J. under the designations Ken-React® LICA® 01, React® LICA® 12, Ken-React® CAPOW®, Ken-React® CAPS® and zirconates available from Kenrich under the designation Ken-React® CAPS NZ 01/L. The filler may be pre-compounded with such additives before mixing with the resin, or the additives may be compounded with the resin and fillers at the melt-blending step.

E. Other Components

In addition to the components noted above, other additives may also be incorporated into the film of the present invention, such as melt stabilizers, processing stabilizers, heat stabilizers, light stabilizers, antioxidants, heat aging stabilizers, whitening agents, antiblocking agents, bonding agents, etc. Phosphite stabilizers (e.g., IRGAFOS available from Ciba Specialty Chemicals of Terrytown, N.Y. and DOVERPHOS available from Dover Chemical Corp. of Dover, Ohio) are exemplary melt stabilizers. In addition, hindered amine stabilizers (e.g., CHIMASSORB available from Ciba Specialty Chemicals) are exemplary heat and light stabilizers. Further, hindered phenols are commonly used as an antioxidant in the production of films. Some suitable hindered phenols include those available from Ciba Specialty Chemicals under the trade name "Irganox®", such as Irganox® 1076,1010, or E 201. Moreover, bonding agents may also be added to the film to facilitate bonding of the film to additional materials (e.g., nonwoven web). Examples of such bonding agents include hydrogenated hydrocarbon resins. Other suitable bonding agents are described in U.S. Pat. No. 4,789,699 to Kieffer et al. and U.S. Pat. No. 5,695,868 to McCormack, which are incorporated herein in their entirety by reference thereto for all purposes. When employed, additives (e.g., lubricant, antioxidant, stabilizer, etc.) may each be present in an amount of from about 0.001 wt. % to about 1 wt. %, in some embodiments, from about 0.005 wt. % to about 1 wt. %, and in some embodiments, from 0.01 wt. % to about 0.5 wt. % of the blend used to form the film.

II. Film Construction

The film of the present invention may be mono- or multi-layered. Multilayer films may be prepared by co-extrusion of the layers, extrusion coating, or by any conventional layering process. Such multilayer films normally contain at least one base layer and at least one skin layer, but may contain any number of layers desired. For example, the multilayer film may be formed from a base layer and one or more skin layers, wherein the base layer is formed from the blend of the present invention. In most embodiments, the skin layer(s) are also formed from the blend as described above. It should be understood, however, that other polymers may also be employed in the skin layer(s). For example, the skin layer may contain an aliphatic-aromatic copolyester, thermoplastic starch, polylactic acid, filler, and/or other components, but may not have the same content or weight percentage as the base layer.

Any known technique may be used to form a film from the compounded material, including blowing, casting, flat die extruding, etc. In one particular embodiment, the film may be formed by a blown process in which a gas (e.g., air) is used to expand a bubble of the extruded polymer blend through an annular die. The bubble is then collapsed and collected in flat film form. Processes for producing blown films are described, for instance, in U.S. Pat. No. 3,354,506 to Raley; U.S. Pat. No. 3,650,649 to Schippers; and U.S. Pat. No. 3,801,429 to Schrenk et al., as well as U.S. Patent Application Publication Nos. 2005/0245162 to McCormack, et al. and 2003/0068951 to Boggs, et al., all of which are incorporated herein in their entirety by reference thereto for all purposes. In yet another embodiment, however, the film is formed using a casting technique.

Figure 1:
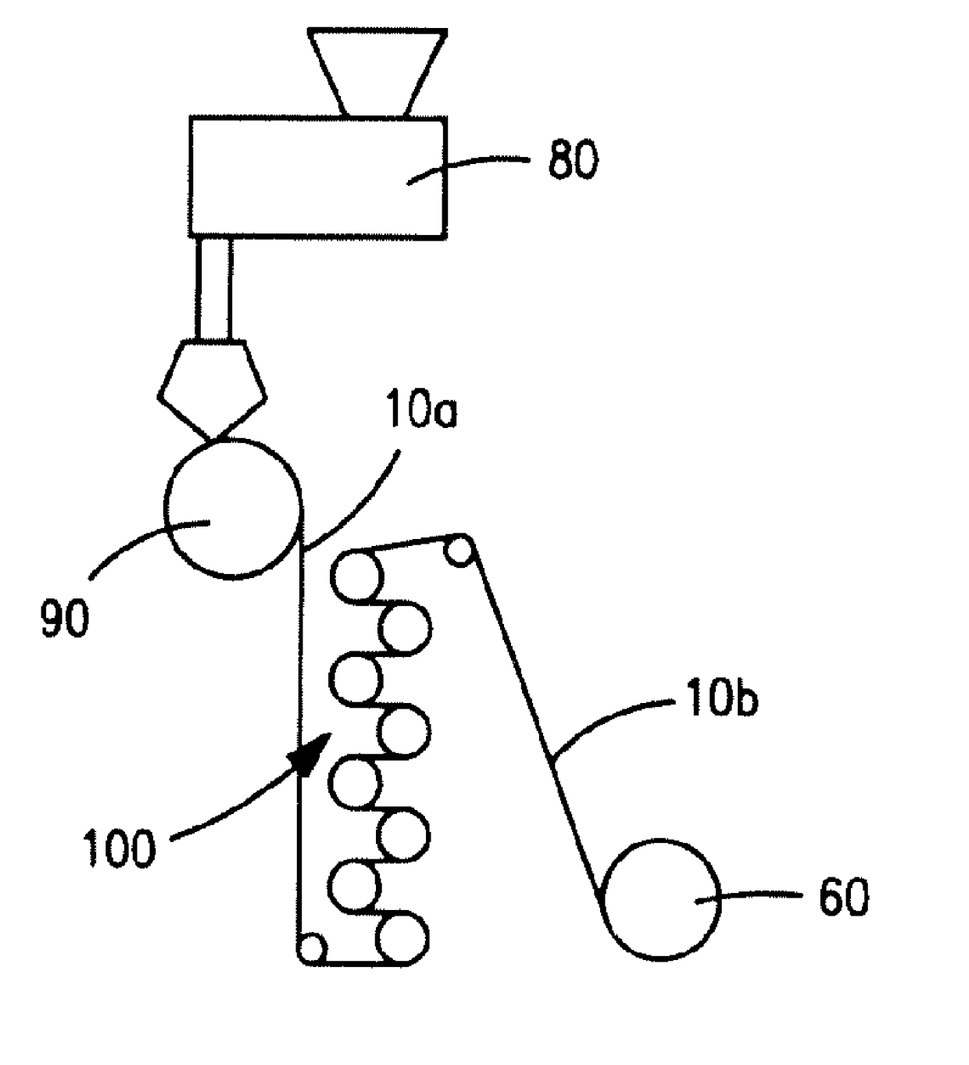
FIG. 1 is a schematic illustration of one embodiment of a method for forming a packaging film in accordance with the present invention.

Referring to FIG. 1, for instance, one embodiment of a method for forming a cast film is shown. The raw materials (e.g., thermoplastic starch, polylactic acid, aliphatic-aromatic copolyester, filler, etc.) may be supplied to a melt blending device, either separately or as a blend. In one embodiment, for example, the components are separately supplied to a melt blending device where they are dispersively blended in a manner such as described above. For example, an extruder may be employed that includes feeding and venting ports. In one embodiment, the thermoplastic starch, polylactic acid, and aliphatic-aromatic copolyester may be fed to a feeding port of the twin-screw extruder and melted. Thereafter, the filler may be fed into the polymer melt. Regardless, the materials are blended under high shear/pressure and heat to ensure sufficient mixing. Melt blending generally occurs at a temperature that is slightly at or above the softening point of the aliphatic-aromatic copolyester and below the decomposition temperature of the blend. For example, melt blending may occur at a temperature of from about 75° C. to about 300° C., in some embodiments, from about 80° C. to about 250° C., and in some embodiments, from about 90° C. to about 200° C. Likewise, the apparent shear rate during melt blending may range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Thereafter, the extruded material may be immediately chilled and cut into pellet form. In the particular embodiment of FIG. 1, the compounded material (not shown) is then supplied to an extrusion apparatus 80 and cast onto a casting roll 90 to form a single-layered precursor film 10a. If a multilayered film is to be produced, the multiple layers are co-extruded together onto the casting roll 90. The casting roll 90 may optionally be provided with embossing elements to impart a pattern to the film. Typically, the casting roll 90 is kept at temperature sufficient to solidify and quench the sheet 10a as it is formed, such as from about 20 to 60° C. If desired, a vacuum box may be positioned adjacent to the casting roll 90 to help keep the precursor film 10a close to the surface of the roll 90. Additionally, air knives or electrostatic pinners may help force the precursor film 10a against the surface of the casting roll 90 as it moves around a spinning roll. An air knife is a device known in the art that focuses a stream of air at a very high flow rate to pin the edges of the film.

Once cast, the film 10a may then be optionally oriented in one or more directions to further improve film uniformity and reduce thickness. Orientation may also form micropores due to the presence of the filler, thus providing breathability to the film. For example, the film may be immediately reheated to a temperature below the melting point of one or more polymers in the film, but high enough to enable the composition to be drawn or stretched. In the case of sequential orientation, the "softened" film is drawn by rolls rotating at different speeds of rotation such that the sheet is stretched to the desired draw ratio in the longitudinal direction (machine direction). This "uniaxially" oriented film may then be laminated to a fibrous web. In addition, the uniaxially oriented film may also be oriented in the cross-machine direction to form a "biaxially oriented" film. For example, the film may be clamped at its lateral edges by chain clips and conveyed into a tenter oven. In the tenter oven, the film may be reheated and drawn in the cross-machine direction to the desired draw ratio by chain clips diverged in their forward travel.

Referring again to FIG. 1, for instance, one method for forming a uniaxially oriented film is shown. As illustrated, the precursor film 10a is directed to a film-orientation unit 100 or machine direction orienter ("MDO"), such as commercially available from Marshall and Willams, Co. of Providence, R.I. The MDO has a plurality of stretching rolls (such as from 5 to 8) which progressively stretch and thin the film in the machine direction, which is the direction of travel of the film through the process as shown in FIG. 1. While the MDO 100 is illustrated with eight rolls, it should be understood that the number of rolls may be higher or lower, depending on the level of stretch that is desired and the degrees of stretching between each roll. The film may be stretched in either single or multiple discrete stretching operations. It should be noted that some of the rolls in an MDO apparatus may not be operating at progressively higher speeds. If desired, some of the rolls of the MDO 100 may act as preheat rolls. If present, these first few rolls heat the film 10a above room temperature (e.g., to 125° F.). The progressively faster speeds of adjacent rolls in the MDO act to stretch the film 10a. The rate at which the stretch rolls rotate determines the amount of stretch in the film and final film weight.

The resulting film 10b may then be wound and stored on a take-up roll 60. While not shown here, various additional potential processing and/or finishing steps known in the art, such as slitting, treating, aperturing, printing graphics, or lamination of the film with other layers (e.g., nonwoven web materials), may be performed without departing from the spirit and scope of the invention.

The thickness of the resulting biodegradable film may generally vary depending upon the desired use. Typically, however, the film has a thickness of about 100 micrometers or less, in some embodiments from about 1 to about 90 micrometers, in some embodiments from about 5 to about 75 micrometers, and in some embodiments, from about 10 to about 60 micrometers. Despite having such a small thickness, the film of the present invention is nevertheless able to retain good mechanical properties during use. One parameter that is indicative of the relative strength of the film is the ultimate tensile strength, which is equal to the peak stress obtained in a stress-strain curve. Desirably, the film of the present invention exhibits an ultimate tensile strength in the machine direction ("MD") of from about 1 to about 50 Megapascals (MPa), in some embodiments from about 5 to about 40 MPa, and in some embodiments, from about 10 to about 30 MPa, and an ultimate tensile strength in the cross-machine direction ("CD") of from about 1 to about 50 Megapascals (MPa), in some embodiments from about 5 to about 40 MPa, and in some embodiments, from about 10 to about 30 MPa. Although possessing good strength, it is also desirable that the film is not too stiff. One parameter that is indicative of the relative stiffness of the film (when dry) is Young's modulus of elasticity, which is equal to the ratio of the tensile stress to the tensile strain and is determined from the slope of a stress-strain curve. For example, the film typically exhibits a Young's modulus in the machine direction ("MD") of from about 100 to about 800 Megapascals ("MPa"), in some embodiments from about 125 to about 700 MPa, and in some embodiments, from about 150 to about 650 MPa, and a Young's modulus in the cross-machine direction ("CD") of from about 50 to about 600 Megapascals ("MPa"), in some embodiments from about 75 to about 500 MPa, and in some embodiments, from about 100 to about 450 MPa. The MD and/or CD peak elongation of the film, which is representative of the ductility of the film, may also be from about 50% to about 600%, in some embodiments from about 100% to about 575%, and in some embodiments, from about 150% to about 550%.

The present invention may be better understood with reference to the following examples.

Test Methods

Tensile Properties:

The strip tensile strength values were determined in substantial accordance with ASTM Standard D638-99. A constant-rate-of-extension type of tensile tester was employed. The tensile testing system was a Sintech 1/D tensile tester, which is available from Sintech Corp. of Cary, N.C. The tensile tester was equipped with TESTWORKS 4.08B software from MTS Corporation to support the testing. An appropriate load cell was selected so that the tested value fell within the range of 10-90% of the full scale load. The film samples were initially cut into dog-bone shapes with a center width of 3.0 mm before testing. The samples were held between grips having a front and back face measuring 25.4 millimeters×76 millimeters. The grip faces were rubberized, and the longer dimension of the grip was perpendicular to the direction of pull. The grip pressure was pneumatically maintained at a pressure of 40 pounds per square inch. The tensile test was run using a gauge length of 18.0 millimeters and a break sensitivity of 40%. Five samples were tested by applying the test load along the machine-direction and five samples were tested by applying the test load along the cross direction. During the test, samples were stretched at a crosshead speed of abut 127 millimeters per minute until breakage occurred. The modulus, peak stress, strain at break (peak elongation), and energy per volume at break were measured in the machine direction ("MD") and cross-machine directions ("CD").

EXAMPLES 1-3

A ZSK-30 Twin Screw Extruder (manufactured by Werner & Pfleider, Ramsey, N.J.) was used to melt compound various blends of ECOFLEX® F BX 7011 (BASF), thermoplastic starch derived from corn ("TPS"), and PLA 4030D (polylactic acid, BASF) in the following weight ratios (ECOFLEX®/TPS/4030D): 54/36/10; 51/34/15; and 48/32/20. The resulting strands were pelletized and then cast into films using a Haake lab-scale film casting unit. The specific compositions, compounding conditions, and film casting parameters for each blend are shown in Tables 1-3 below. The extruder temperatures varied slightly between blends for both compounding and film casting.

TABLE 1

| | Film Content | | | | |
|---|---|---|---|---|---|
| Example | ECOFLEX ® (wt. %) | Thermoplastic Starch (wt. %) | PLA 4030D (wt. %) | Filler (wt. %) | Ratio of Ductile to Stiff Components |
| Control | 60 | 40 | 0 | 0 | — |
| 1 | 54 | 36 | 10 | 0 | 9.00 |
| 2 | 51 | 34 | 15 | 0 | 5.67 |
| 3 | 48 | 32 | 20 | 0 | 4.00 |

TABLE 2

| | Compounding Conditions | | | | | | | | | |
|---|---|---|---|---|---|---|---|---|---|---|
| | Extruder Conditions (° C.) | | | | | | | Screw Speed (rpm) | Torque (%) | Melt Temp. (° C.) |
| Example | Zone 1 | 2 | 3 | 4 | 5 | 6 | 7 | | | |
| Control | 140 | 150 | 155 | 155 | 155 | 150 | 140 | 150 | 96-100 | 160 |
| 1 | 150 | 160 | 170 | 175 | 175 | 175 | 150 | 200 | 93-98 | 160 |
| 2 | 150 | 160 | 170 | 175 | 175 | 175 | 150 | 200 | 93-98 | 161 |
| 3 | 150 | 160 | 180 | 180 | 180 | 170 | 155 | | 93-99 | 169 |

TABLE 3

| | Film Casting Conditions | | | | | |
|---|---|---|---|---|---|---|
| | Extruder Conditions (° C.) | | | | | Melt Temp. (° C.) |
| Example | Zone 1 | 2 | 3 | 4 | 5 | |
| Control | 150 | 160 | 160 | 160 | 155 | 173 |
| 1 | 150 | 160 | 165 | 165 | 158 | 187 |
| 2 | 150 | 160 | 165 | 165 | 158 | 186 |
| 3 | 160 | 170 | 175 | 175 | 168 | 189 |

The resulting film properties (thickness, peak stress, elongation, modulus and toughness) were determined and shown in Table 4.

TABLE 4

| | Film Properties | | | | | | | | | |
|---|---|---|---|---|---|---|---|---|---|---|
| | Thickness (mil) | | Peak Stress (MPa) | | Strain at Break (%) | | Modulus (MPa) | | Energy Per Volume at Break (J/cm^3) | |
| Example | MD | CD | MD | CD | MD | CD | MD | CD | MD | CD |
| Control Mean | 1.67 | 1.62 | 34 | 27 | 548 | 898 | 83 | 100 | 118 | 130 |
| 1 | 1.09 | 0.91 | 29 | 24 | 366 | 631 | 157 | 108 | 91 | 69 |
| 2 | 1.56 | 1.64 | 30 | 25 | 305 | 592 | 289 | 151 | 62 | 92 |
| 3 | 1.66 | 1.72 | 41 | 26 | 253 | 476 | 580 | 397 | 71 | 81 |

As the amount of 4030D PLA (polylactic acid) was increased in blends containing ECOFLEX® and thermoplastic starch, the modulus increased. A large increase was noted in the machine direction (MD) as the modulus increased from 83 MPa for a 60/40 ECOFLEX®/TPS blend to 580 MPa for a blend containing 20% 4030D PLA. The addition of 4030D PLA provided films of greater stiffness, which is often a requirement for packaging and bagging operations. While the modulus increased, the elongation of the films decreased accordingly as 4030D PLA was added. Blends containing the pure 60/40 ECOFLEX®/TPS were soft and flexible with good elongation; however, stretchy films are always not desirable for certain packaging applications. Thus, by adding even 10% 4030D PLA to the pure blend, the elongation was decreased in both the MD and cross direction (CD). Further, as the ratio of ductile-to-rigid components decreased, the modulus generally increased and the strain at break ("peak elongation") generally decreased.

EXAMPLES 4-5

A ZSK-30 Twin Screw Extruder (manufactured by Werner & Pfleider, Ramsey, N.J.) was used to melt compound various blends of ECOFLEX® F BX 7011 (BASF), thermoplastic starch derived from corn ("TPS"), and Omya Carb 2sst calcium carbonate (Omya Inc.) in the following weight ratios (ECOFLEX®/TPS/calcium carbonate): 54/36/10 and 48/32/20. The resulting strands were pelletized and then cast into films using a Haake lab-scale film casting unit. The specific film content, compounding conditions, and film casting parameters for each blend are shown in Tables 5-7. The extruder temperatures varied slightly between blends for both compounding and film casting.

TABLE 5

| | Film Content | | | | |
|---|---|---|---|---|---|
| Example | ECOFLEX ® (wt. %) | Thermoplastic Starch (wt. %) | PLA 4030D (wt. %) | Filler (wt. %) | Ratio of Ductile to Stiff Components |
| Control | 60 | 40 | 0 | 0 | — |
| 4 | 54 | 36 | 0 | 10 | 9.00 |
| 5 | 48 | 32 | 0 | 20 | 4.00 |

TABLE 6

| | Compounding Conditions | | | | | | | | | |
|---|---|---|---|---|---|---|---|---|---|---|
| | Extruder Conditions (° C.) | | | | | | | Screw Speed (rpm) | Torque (%) | Melt Temp. (° C.) |
| Example | Zone 1 | 2 | 3 | 4 | 5 | 6 | 7 | | | |
| Control | 140 | 150 | 155 | 155 | 155 | 150 | 140 | 150 | 96-100 | 160 |
| 4 | 150 | 160 | 180 | 180 | 180 | 170 | 155 | 200 | 98-100 | 171 |
| 5 | 150 | 160 | 180 | 180 | 180 | 170 | 155 | 200 | 98-100 | 171 |

TABLE 7

| | Film Casting Conditions | | | | | |
|---|---|---|---|---|---|---|
| | Extruder Conditions (° C.) | | | | | Melt |
| Example | Zone 1 | 2 | 3 | 4 | 5 | Temp. (° C.) |
| Control | 150 | 160 | 160 | 160 | 155 | 173 |
| 4 | 160 | 170 | 175 | 175 | 168 | 190 |
| 5 | 160 | 170 | 175 | 175 | 168 | 190 |

The resulting film properties (thickness, peak stress, elongation, modulus and toughness) were determined and shown in Table 8.

TABLE 8

| | Film Properties | | | | | | | | | |
|---|---|---|---|---|---|---|---|---|---|---|
| | Thickness (mil) | | Peak Stress (MPa) | | Strain at Break (%) | | Modulus (MPa) | | Energy Per Volume at Break (J/cm$^3$) | |
| Example | MD | CD | MD | CD | MD | CD | MD | CD | MD | CD |
| Control Mean | 1.67 | 1.62 | 34 | 27 | 548 | 898 | 83 | 100 | 118 | 130 |
| 4 | 1.68 | 1.646 | 28 | 21 | 413 | 688 | 82 | 131 | 76 | 83 |
| 5 | 1.73 | 1.614 | 23 | 17 | 408 | 618 | 134 | 168 | 65 | 67 |

As the amount of calcium carbonate was increased in blends containing ECOFLEX® and thermoplastic starch, the modulus began to increase. The greatest increase in modulus was noticed in blends containing 20% calcium carbonate. For this blend, the modulus increased from 83 MPa to 134 MPa in the MD, and from 100 MPa to 168 MPa in the CD, when compared to a pure 60/40 ECOFLEX®/TPS blend. The blend containing 10% calcium carbonate maintained its MD modulus, but increased 30 MPa in the CD direction. While the modulus increased, the elongation of the films decreased when 10 and 20% calcium carbonate was added to the blends. Interestingly, there was a reduction in elongation when transitioning from pure 60/40 ECOFLEX®/TPS to blends containing 10% calcium carbonate; however, after adding 20% calcium carbonate, the elongation was essentially the same as films containing 10% calcium carbonate. Further, as the ratio of ductile-to-rigid components decreased, the modulus generally decreased and the strain at break ("peak elongation") generally increased.

EXAMPLES 6-7

A ZSK-30 Twin Screw Extruder (manufactured by Werner & Pfleider, Ramsey, N.J.) was used to melt compound various blends of ECOFLEX® F BX 7011 (BASF), thermoplastic starch derived from corn ("TPS"), and talc (Specialty Minerals) in the following weight ratios (ECOFLEX®/TPS/talc): 54/36/10 and 48/32/20. The resulting strands were pelletized and then cast into films using a Haake lab-scale film casting unit. The specific film content, compounding conditions, and film casting parameters for each blend are shown in Tables 9-11 below. The extruder temperatures varied slightly between blends for both compounding and film casting.

TABLE 9

| | | Film Content | | | |
|---|---|---|---|---|---|
| Sample | ECOFLEX ® (wt. %) | Thermoplastic Starch (wt. %) | PLA 4030D (wt. %) | Filler (wt. %) | Ratio of Ductile to Stiff Components |
| Control | 60 | 40 | 0 | 0 | — |
| 6 | 54 | 36 | 0 | 10 | 9.00 |
| 7 | 48 | 32 | 0 | 20 | 4.00 |

TABLE 10

| | Compounding Conditions | | | | | | | | | |
|---|---|---|---|---|---|---|---|---|---|---|
| | Extruder Conditions (° C.) | | | | | | | Screw Speed (rpm) | Torque (%) | Melt Temp. (° C.) |
| Example | Zone 1 | 2 | 3 | 4 | 5 | 6 | 7 | | | |
| Control | 140 | 152 | 155 | 155 | 155 | 150 | 140 | 150 | 95 | 159 |
| 6 | 140 | 152 | 155 | 155 | 155 | 150 | 140 | 150 | 90 | 160 |
| 7 | 140 | 152 | 155 | 155 | 155 | 150 | 140 | 150 | 90 | 159 |

TABLE 11

| | Casting Conditions | | | | | |
|---|---|---|---|---|---|---|
| | Extruder Conditions (° C.) | | | | | Melt |
| Example | Zone 1 | 2 | 3 | 4 | 5 | Temp. (° C.) |
| Control | 160 | 170 | 173 | 175 | 170 | 180 |
| 6 | 160 | 170 | 173 | 175 | 170 | 179 |
| 7 | 160 | 170 | 173 | 175 | 170 | 179 |

The resulting film properties (thickness, peak stress, elongation, modulus and toughness) were determined and shown in Table 12.

TABLE 12

| | Film Properties | | | | | | | | | |
|---|---|---|---|---|---|---|---|---|---|---|
| | Thickness (mil) | | Peak Stress (MPa) | | Strain at Break (%) | | Modulus (MPa) | | Energy Per Volume at Break (J/cm^3) | |
| Example | MD | CD | MD | CD | MD | CD | MD | CD | MD | CD |
| Control Mean | 1.35 | 1.45 | 28 | 22 | 625 | 841 | 87 | 85 | 110 | 103 |
| 6 | 1.69 | 1.73 | 19 | 15 | 459 | 646 | 96 | 97 | 61 | 63 |
| 7 | 1.76 | 1.58 | 19 | 13 | 415 | 527 | 96 | 89 | 56 | 48 |

The modulus of the blends containing talc remained fairly consistent. However, the elongation of the films decreased as the amount of talc was increased, especially in the CD direction. Further, as the ratio of ductile-to-rigid components decreased, the modulus generally decreased and the strain at break ("peak elongation") generally increased.

EXAMPLES 8-13

A ZSK-30 Twin Screw Extruder (manufactured by Werner & Pfleider, Ramsey, N.J.) was used to melt compound various blends of ECOFLEX® F BX 7011 (BASF), thermoplastic starch derived from corn ("TPS"), PLA 4030D (polylactic acid, BASF), and Omya Carb 2sst calcium carbonate (Omya Inc) in the following weight ratios (ECOFLEX®/TPS/4030D/calcium carbonate): 48/32/10/10, 45/30/10/10, 42/28/20/10, 42/28/10/20, 39/26/15/20, and 36/24/20/20. The resulting strands were pelletized and then cast into films using a Haake lab-scale film casting unit. The specific film content, compounding conditions, and film casting parameters for each blend are shown in Tables 13-15 below. The extruder temperatures varied slightly between blends for both compounding and film casting.

TABLE 13

Film Content

| Example | ECOFLEX® (wt. %) | Thermoplastic Starch (wt. %) | PLA 4030D (wt. %) | Filler (wt. %) | Ratio of Ductile to Stiff Components |
|---|---|---|---|---|---|
| Control | 60 | 40 | 0 | 0 | — |
| 8 | 48 | 32 | 10 | 10 | 4.00 |
| 9 | 45 | 30 | 15 | 10 | 3.00 |
| 10 | 42 | 28 | 20 | 10 | 2.33 |
| 11 | 42 | 28 | 10 | 20 | 2.33 |
| 12 | 39 | 26 | 15 | 20 | 1.86 |
| 13 | 36 | 24 | 20 | 20 | 1.50 |

TABLE 14

Compounding Conditions

| Example | Extruder Conditions (° C.) | | | | | | | Screw Speed (rpm) | Torque (%) | Melt Temp. (° C.) |
| | Zone 1 | 2 | 3 | 4 | 5 | 6 | 7 | | | |
|---|---|---|---|---|---|---|---|---|---|---|
| Control | 140 | 150 | 155 | 155 | 155 | 150 | 140 | 150 | 96-100 | 160 |
| 8 | 150 | 160 | 180 | 180 | 180 | 170 | 160 | | 98-100 | 177 |
| 9 | 150 | 160 | 180 | 180 | 180 | 170 | 160 | | 98-102 | 173 |
| 10 | 150 | 160 | 180 | 180 | 180 | 170 | 160 | | 92-98 | 173 |
| 11 | 150 | 160 | 180 | 180 | 180 | 170 | 160 | | 92-97 | 173 |
| 12 | 150 | 160 | 180 | 180 | 180 | 170 | 160 | | 90-92 | 172 |
| 13 | 150 | 160 | 180 | 180 | 180 | 170 | 160 | | 88-92 | 172 |

TABLE 15

Film Casting Conditions

| Example | Extruder Conditions (° C.) | | | | | Melt Temp. (° C.) |
| | Zone 1 | 2 | 3 | 4 | 5 | |
|---|---|---|---|---|---|---|
| Control | 150 | 160 | 160 | 160 | 155 | 173 |
| 8 | 160 | 170 | 175 | 175 | 168 | 190 |
| 9 | 160 | 170 | 175 | 175 | 168 | 191 |
| 10 | 160 | 170 | 175 | 175 | 168 | 190 |
| 11 | 160 | 170 | 175 | 175 | 168 | 190 |
| 12 | 160 | 170 | 175 | 175 | 168 | 191 |
| 13 | 160 | 170 | 175 | 175 | 168 | 191 |

The resulting film properties (thickness, peak stress, elongation, modulus and toughness) were determined and shown in Table 16.

TABLE 16

Tensile Properties

| Example | Thickness (mil) | | Peak Stress (MPa) | | Strain at Break (%) | | Modulus (MPa) | | Energy Per Volume at Break (J/cm^3) | |
|---|---|---|---|---|---|---|---|---|---|---|
| | MD | CD | MD | CD | MD | CD | MD | CD | MD | CD |
| Control Mean | 1.67 | 1.62 | 34 | 27 | 548 | 898 | 83 | 100 | 118 | 130 |
| 8 | 1.64 | 1.654 | 24 | 17 | 229 | 467 | 309 | 216 | 39 | 57 |
| 9 | 1.72 | 1.874 | 30 | 23 | 246 | 522 | 518 | 295 | 51 | 82 |
| 10 | 1.72 | 1.744 | 31 | 21 | 246 | 410 | 620 | 437 | 53 | 64 |
| 11 | 1.70 | 1.74 | 20 | 13 | 259 | 326 | 390 | 370 | 40 | 36 |
| 12 | 1.63 | 1.86 | 20 | 14 | 213 | 278 | 514 | 410 | 35 | 33 |
| 13 | 1.88 | 1.808 | 14 | 9 | 93 | 22 | 542 | 374 | 13 | 2 |

As the amount of 4030D PLA was increased, the modulus also increased in a stepwise manner. For example, when adding 10% of both 4030D PLA and calcium carbonate, the modulus increased from 83 MPa to 309 MPa in the MD and from 100 MPa to 216 MPa in the CD, when compared to a pure 60/40 ECOFLEX®/TPS blend. The modulus continued to increase from 309 MPa to 518 MPa to 620 MPa in the MD as the 4030D PLA content was increased. A similar trend was observed in the CD. While there was still an increase in modulus as the 4030D PLA and calcium carbonate were added to the blend, the stepwise trend was not observed with the 10% calcium carbonate blends. While the modulus increased, the elongation of the films decreased when 4030D PLA and calcium carbonate were added to the blends. Once again, a great decrease existed when adding even 10% of both 4030D PLA and calcium carbonate; however, this decrease in properties remained linear for all blends containing 10% calcium carbonate. Basically, when 10% calcium carbonate was added to the blend, 10, 15 or 20% 4030D PLA could be added without greatly impacting elongation results. On the other hand, when 20% calcium carbonate was added to the films, a continual decline in elongation was observed as the amount of 4030D PLA was increased from 10 to 20%. Further, as the ratio of ductile-to-rigid components decreased, the modulus generally decreased and the strain at break ("peak elongation") generally increased.

EXAMPLES 14-15

A ZSK-30 Twin Screw Extruder (manufactured by Werner & Pfleider, Ramsey, N.J.) was used to melt compound various blends of ECOFLEX® F BX 7011 (BASF), thermoplastic starch derived from corn ("TPS"), PLA 4030D (polylactic acid, BASF), and talc (Specialty Minerals) in the following weight ratios (ECOFLEX®/TPS/4030D/talc): 48/32/10/10 and 42/28/10/20. The resulting strands were pelletized and then cast into films using a Haake lab-scale film casting unit. The specific film content, compounding conditions, and film casting parameters for each blend are shown in Tables 17-19 below. The extruder temperatures varied slightly between blends for both compounding and film casting.

TABLE 17

Film Content

| Example | ECOFLEX® (wt. %) | Thermoplastic Starch (wt. %) | PLA 4030D (wt. %) | Filler (wt. %) | Ratio of Ductile to Stiff Components |
|---|---|---|---|---|---|
| Control | 60 | 40 | 0 | 0 | — |
| 14 | 48 | 32 | 10 | 10 | 4.00 |
| 15 | 42 | 28 | 10 | 20 | 2.33 |

TABLE 18

Compounding Conditions

| Example | Extruder Conditions (° C.) | | | | | | | Screw Speed (rpm) | Torque (%) | Melt Temp. (° C.) |
|---|---|---|---|---|---|---|---|---|---|---|
| | Zone 1 | 2 | 3 | 4 | 5 | 6 | 7 | | | |
| Control | 140 | 152 | 155 | 155 | 155 | 150 | 140 | 150 | 95 | 159 |
| 14 | 140 | 150 | 155 | 155 | 155 | 150 | 140 | 150 | 85 | 161 |
| 15 | 140 | 150 | 155 | 155 | 155 | 150 | 140 | 150 | 95 | 161 |

TABLE 19

Film Casting Conditions

| Example | Extruder Conditions (° C.) | | | | | Melt Temp. (° C.) |
|---|---|---|---|---|---|---|
| | Zone 1 | 2 | 3 | 4 | 5 | |
| Control | 160 | 170 | 173 | 175 | 170 | 180 |
| 14 | 180 | 190 | 193 | 195 | 190 | 202 |
| 15 | 180 | 190 | 193 | 195 | 190 | 202 |

The resulting film properties (thickness, peak stress, elongation, modulus and toughness) were determined and shown in Table 20.

TABLE 20

Tensile Properties

| Example | Thickness (mil) | | Peak Stress (MPa) | | Strain at Break (%) | | Modulus (MPa) | | Energy Per Volume at Break (J/cm^3) | |
|---|---|---|---|---|---|---|---|---|---|---|
| | MD | CD | MD | CD | MD | CD | MD | CD | MD | CD |
| Control Mean | 1.35 | 1.45 | 28 | 22 | 625 | 841 | 87 | 85 | 110 | 103 |
| 14 | 1.75 | 1.84 | 16 | 12 | 163 | 315 | 186 | 135 | 20 | 29 |
| 15 | 1.94 | 2.12 | 13 | 11 | 97 | 192 | 195 | 157 | 11 | 18 |

As indicated, the addition of 4030D PLA increased the stiffness of the films, but the varying amounts of talc did not substantially change material properties. For example, when adding 10% of both 4030D PLA and talc, the modulus increased from 87 MPa to 186 MPa in the MD and from 85 MPa to 135 MPa in the CD, when compared to a pure 60/40 ECOFLEX®/TPS blend. The modulus remained similar when the amount of talc was increased from 10% to 20%. While the modulus remained fairly constant with either 10% or 20% talc addition, the elongation results continued to decrease. This decrease occurred as all other components (ECOFLEX®, TPS and PLA) remained constant. Further, as the ratio of ductile-to-rigid components decreased, the modulus generally decreased and the strain at break ("peak elongation") generally increased.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A biodegradable packaging film, wherein the film includes a blend that comprises at least one thermoplastic starch in an amount of from about 10 wt. % to about 60 wt. % of the blend, at least one polylactic acid in an amount of from about 1 wt. % to about 30 wt. % of the blend, at least one aliphatic-aromatic copolyester in an amount of from about 20 wt. % to about 70 wt. % of the blend, and at least one filler in an amount of from about 1 wt. % to about 25 wt. % of the blend, wherein the ratio of the total weight percentage of the aliphatic-aromatic copolyester and thermoplastic starch to the total weight percentage of the polylactic acid and filler is from 4 to about 10; wherein the film exhibits a peak elongation of from about 50% to about 600% at a strain rate of about 127 millimeters per minute in the machine direction.

2. The biodegradable packaging film of claim 1, wherein the thermoplastic starch constitutes from about 20 wt. % to about 50 wt. % of the blend.

3. The biodegradable packaging film of claim 1, wherein the polylactic acid constitutes from about 5 wt. % to about 25 wt. % of the blend.

4. The biodegradable packaging film of claim 1, wherein the aliphatic-aromatic copolyester constitutes from about 30 wt. % to about 60 wt. % of the blend.

5. The biodegradable packaging film of claim 1, wherein the filler constitutes from about 8 wt. % to about 15 wt. % of the blend.

6. The biodegradable packaging film of claim 1, wherein the thermoplastic starch includes from about 40 wt. % to about 90 wt. % of at least one starch and from about 10 wt. % to about 45 wt % of at least one plasticizer.

7. The biodegradable packaging film of claim 6, wherein the starch includes a modified starch.

8. The biodegradable packaging film of claim 6, wherein the plasticizer includes a polyol.

9. The biodegradable packaging film of claim 1, wherein the thermoplastic starch has a melt flow index of from about 0.05 to about 50 grams per 10 minutes, determined at a load of 2160 grams and temperature of 190° C. in accordance with ASTM Test Method D1238-E.

10. The biodegradable packaging film of claim 1, wherein the aliphatic-aromatic copolyester is formed from an aromatic monomer that includes terephthalic acid or a derivative thereof, phthalic acid or a derivative thereof, isophthalic acid or a derivative thereof, or a combination of the foregoing.

11. The biodegradable packaging film of claim 1, wherein the aliphatic-aromatic copolyester is represented by the following general structure:

wherein, m is an integer from 2 to 10;

n is an integer from 0 to 18;

p is an integer from 2 to 10;

x is an integer greater than 1; and y is an integer greater than 1.

12. The biodegradable packaging film of claim 1, wherein the aliphatic-aromatic copolyester includes polybutylene adipate terephthalate.

13. The biodegradable packaging film of claim 1, wherein the aliphatic-aromatic copolyester has a glass transition temperature of about 0° C. or less.

14. The biodegradable packaging film of claim 1, wherein the polylactic acid contains monomer units derived from L-lactic acid, D-lactic acid, racemic lactic acid, or mixtures thereof.

15. The biodegradable packaging film of claim 1, wherein the polylactic acid has a glass transition temperature of from about 10° C. to about 80° C.

16. The biodegradable packaging film of claim 1, wherein the filler includes inorganic oxide particles.

17. The biodegradable packaging film of claim 16, wherein the particles include calcium carbonate particles.

18. The biodegradable packaging film of claim 1, wherein the filler includes particles having an average size of from about 0.5 to about 10 micrometers.

19. The biodegradable packaging film of claim 1, wherein the film has a thickness of about 100 micrometers or less.

20. The biodegradable packaging film of claim 1, wherein the film exhibits an ultimate tensile strength in the machine direction of from about 1 to about 50 Megapascals and a Young's modulus in the machine direction of from about 100 to about 800 Megapascals.

21. The biodegradable packaging film of claim 1, wherein the film exhibits a ultimate tensile strength of from about 5 to about 40 Megapascals in the machine direction and a Young's modulus of from about 150 to about 650 Megapascals in the machine direction.

22. The biodegradable packaging film of claim 1, wherein the film exhibits an ultimate tensile strength of from about 1 to about 50 Megapascals in the cross-machine direction and a Young's modulus of from about 50 to about 600 Megapascals in the cross-machine direction.

23. The biodegradable packaging film of claim 1, wherein the film exhibits an ultimate tensile strength of from about 5 to about 40 Megapascals in the cross-machine direction and a modulus of elasticity of from about 100 to about 450 Megapascals in the cross-machine direction.

24. The biodegradable packaging film of claim 1, wherein the film is multi-layered and contains at least one base layer and at least one skin layer.

25. The biodegradable packaging film of claim 24, wherein the base layer includes the blend.

26. The biodegradable packaging film of claim 1, wherein the film exhibits a peak elongation of from about from about 150% to about 550% at a strain rate of about 127 millimeters per minute in the machine direction.

27. The biodegradable packaging film of claim 1, wherein the film exhibits a peak elongation of from about from about 150% to about 550% at a strain rate of about 127 millimeters per minute in the cross-machine direction.

28. The biodegradable packaging film of claim 1, wherein the film exhibits a Young's modulus in the machine direction of from about from about 100 to about 195 Megapascals.

* * * * *

UNITED STATES PATENT AND TRADEMARK OFFICE
CERTIFICATE OF CORRECTION

| | | |
|---|---|---|
| PATENT NO. | : 8,188,185 B2 | Page 1 of 1 |
| APPLICATION NO. | : 12/164487 | |
| DATED | : May 29, 2012 | |
| INVENTOR(S) | : James H. Wang and Sarah A. Funk | |

It is certified that error appears in the above-identified patent and that said Letters Patent is hereby corrected as shown below:

ON THE TITLE PAGE:

Item (75) Inventors:

"Sara A. Funk" should read --Sarah A. Funk--

Signed and Sealed this

Fourth Day of September, 2012

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 8,188,185 B2 |
| APPLICATION NO. | : 12/164487 |
| DATED | : May 29, 2012 |
| INVENTOR(S) | : James H. Wang and Sarah A. Funk |

Page 1 of 1

It is certified that error appears in the above-identified patent and that said Letters Patent is hereby corrected as shown below:

In the Claims:

Column 28, line 31 (Claim 28) "of from about from about 100 to about 195 Megapascals." should read -- of from about 100 to about 195 Megapascals. --

Signed and Sealed this
Eleventh Day of December, 2012

David J. Kappos
*Director of the United States Patent and Trademark Office*